(12) United States Patent
Morris (10) Patent No.: US 10,082,420 B2
(45) Date of Patent: Sep. 25, 2018

(54) METHOD AND APPARATUS FOR DETERMINING THE MASS OF A BODY

(71) Applicant: LACSOP LIMITED, Ras Al Khaimah (AE)

(72) Inventor: Gordon A. Morris, Edinburgh (GB)

( * ) Notice: Subject to any disclaimer, the term of this patent is extended or adjusted under 35 U.S.C. 154(b) by 20 days.

(21) Appl. No.: 14/910,376

(22) PCT Filed: Aug. 4, 2014

(86) PCT No.: PCT/GB2014/052382
§ 371 (c)(1),
(2) Date: Feb. 5, 2016

(87) PCT Pub. No.: WO2015/019068
PCT Pub. Date: Feb. 12, 2015

(65) Prior Publication Data
US 2016/0187184 A1 Jun. 30, 2016

(30) Foreign Application Priority Data
Aug. 6, 2013 (GB) .................................. 1314075.1

(51) Int. Cl.
| | | |
|---|---|---|
| G01G 19/00 | (2006.01) | |
| G01G 19/07 | (2006.01) | |
| G01G 9/00 | (2006.01) | |
| G01G 19/08 | (2006.01) | |

(52) U.S. Cl.
CPC ............... *G01G 19/07* (2013.01); *G01G 9/00* (2013.01); *G01G 19/086* (2013.01)

(58) Field of Classification Search
CPC ......... G01G 9/00; G01G 19/07; G01G 19/086
See application file for complete search history.

(56) References Cited

U.S. PATENT DOCUMENTS

| | | | | |
|---|---|---|---|---|
| 4,110,605 A | * | 8/1978 | Miller | .................... G01G 19/07 |
| | | | | 701/124 |
| 4,490,802 A | | 12/1984 | Miller | |
| 4,980,833 A | * | 12/1990 | Milligan | .............. G05D 1/0083 |
| | | | | 244/183 |

(Continued)

FOREIGN PATENT DOCUMENTS

| | | |
|---|---|---|
| CN | 101619970 A | 1/2010 |
| CN | 202092637 U | 12/2011 |

(Continued)

*Primary Examiner* — David Bolduc
(74) *Attorney, Agent, or Firm* — FisherBroyles, LLP (57) ABSTRACT

A method for determining the mass of a body is described. The method comprises the application and measurement of a first motive force to the body to move the body in a first state of motion. The acceleration of the body is also measured at this time. This methodology is repeated for a second state of motion. The measured motive forces and accelerations are then used to calculate the mass, and hence the weight of the body. An accelerometer may be employed to measure the accelerations. The methods may be adapted so as to correct for the angle $\theta$ of the ground across which the body is moved and or the tilt angle $\alpha$ of the accelerometer relative to the ground. The methods may employ a novel surface angle measuring device that does not require contact with the ground and which does not require the body to be stationary.

33 Claims, 4 Drawing Sheets

(56) References Cited

U.S. PATENT DOCUMENTS

| | | | | |
|---|---|---|---|---|
| 5,133,212 | A | * | 7/1992 | Grills ............... G01F 23/0076 177/136 |
| 5,337,982 | A | * | 8/1994 | Sherry ............... G05D 1/0607 244/177 |
| 5,353,022 | A | * | 10/1994 | Middleton ........... G05D 1/0083 340/959 |
| 5,386,736 | A | * | 2/1995 | Spillman, Jr. ....... G01F 23/0076 73/149 |
| 5,457,630 | A | * | 10/1995 | Palmer .................... B64C 13/50 180/116 |
| 5,531,031 | A | | 7/1996 | Green |
| 5,606,505 | A | * | 2/1997 | Smith ................. G05D 1/0005 701/15 |
| 5,771,177 | A | * | 6/1998 | Tada ....................... G01G 3/00 702/41 |
| 5,796,612 | A | * | 8/1998 | Palmer .................... B64C 13/50 244/12.1 |
| 5,930,904 | A | | 8/1999 | Mualem |
| 6,002,972 | A | * | 12/1999 | Palmer .................... B64D 15/20 180/116 |
| 6,133,857 | A | * | 10/2000 | Millard ................. G01C 23/00 340/945 |
| 6,175,315 | B1 | * | 1/2001 | Millard ................. G01D 7/002 340/959 |
| 6,314,383 | B1 | * | 11/2001 | Leimbach ............. B60T 8/172 702/173 |
| 6,415,242 | B1 | * | 7/2002 | Weldon, Jr. ........... G01G 19/07 702/101 |
| 6,434,494 | B1 | * | 8/2002 | Forsythe, Jr. ....... G01F 23/0061 702/156 |
| 6,650,974 | B2 | * | 11/2003 | Chamas ................ G01M 1/125 701/124 |
| 6,700,503 | B2 | * | 3/2004 | Masar .................. G01F 15/063 340/870.01 |
| 7,415,364 | B2 | * | 8/2008 | Mazrooee ............ B28C 7/0418 324/306 |
| 7,835,829 | B2 | * | 11/2010 | Villaume ............. G05D 1/0661 244/183 |
| 2004/0051860 | A1 | | 3/2004 | Honda et al. |
| 2004/0167705 | A1 | * | 8/2004 | Lingman ................ B60T 8/172 701/124 |
| 2004/0260434 | A1 | * | 12/2004 | Zammit-Mangion ....... G05D 1/0083 701/15 |
| 2005/0065695 | A1 | * | 3/2005 | Grieser ................... B60T 8/172 701/70 |
| 2009/0104846 | A1 | | 4/2009 | Junge et al. |
| 2010/0085578 | A1 | | 4/2010 | Weiss et al. |
| 2011/0060549 | A1 | * | 3/2011 | Nielsen .................. G06Q 10/06 702/141 |
| 2011/0172877 | A1 | * | 7/2011 | Dourra ................... F16H 59/52 701/33.4 |
| 2015/0114103 | A1 | * | 4/2015 | Marcos Montes ...... G01F 22/00 73/290 R |

FOREIGN PATENT DOCUMENTS

| | | |
|---|---|---|
| DE | 10 244 789 A1 | 4/2004 |
| DE | 10 2007 045 998 A1 | 4/2009 |
| DE | 10 2008 042 315 A1 | 4/2010 |
| EP | 1 298 020 A1 | 4/2003 |
| EP | 1 327 854 A1 | 7/2003 |
| EP | 2 037 294 A2 | 3/2009 |
| EP | 2 719 475 A1 | 4/2014 |
| FR | 2 976 071 A1 | 12/2012 |
| JP | 04-250307 A | 9/1992 |
| KR | 10-2012-0011592 A | 2/2012 |
| WO | WO 00/37888 A1 | 6/2000 |
| WO | WO 2013/167840 A2 | 11/2013 |

\* cited by examiner

METHOD AND APPARATUS FOR DETERMINING THE MASS OF A BODY

This application is the U.S. national phase of International Application No. PCT/GB2014/052382 filed 4 Aug. 2014 which designated the U.S. and claims priority to GB Patent Application No. 1314075.1 filed 6 Aug. 2013, the entire contents of each of which are hereby incorporated by reference.

The present invention relates to the field of mechanics. In particular, methods and apparatus for determining the mass, and hence the weight, of a body are described. The described methods and apparatus find particular application in the determination of the mass of a rolling body or vehicle e.g. a passenger aircraft.

BACKGROUND TO THE INVENTION

Knowing the weight of an aircraft at the time of take-off is a critical factor in terms of the safety, fuel usage and engine life and maintenance requirements. By way of example on a passenger aircraft the Flight Management System (FMS) is employed to calculate the total weight of the aircraft. The current procedure employed by the FMS is based on data extracted from the aircraft load sheet, for example the:

a) Aircraft Prepared for Service (APS) weight;
b) Cargo and passenger's hold baggage weight, based on adding the weight of individual items loaded onto the aircraft;
c) Weight of catering supplies loaded for the flight;
d) Fuel load; and
e) Total weight of passengers and their hand baggage.

Based on the total weight calculated by the FMS the aircraft pilot has to make a decision as to the appropriate thrust settings to be employed in order to allow the aircraft to get off the runway and climb to the desired altitude. Other factors that may be taken into consideration for take-off by the pilot, in conjunction with the FMS, are the weather conditions, the runway length, and the altitude of the airport.

As will be appreciated by those skilled in the art, the engine thrust settings at take-off determine the amount of fuel used and significantly affects the interval between maintaining and servicing of the engines.

The weights describe at a) to d) above can be accurately determined. However, the "total weight of passengers and their hand baggage" is presently calculated by employing standard passenger weights for adults and children. This weight includes an allowance for hand baggage and is approved by the state of registration's regulatory authorities. For an adult this weight is usually taken to be 84 kg. In practice their can be a significant variance in the weight of passengers themselves and the hand baggage they bring onto the plane e.g. tall adult man who has hand baggage plus duty free will weigh significantly more than a small women with no hand luggage. This variance can become quite significant to the overall weight of a passenger aircraft which are routinely employed to transport several hundred passengers at a time.

As a result of the uncertainty in the data about the weight of the aircraft, and possible errors in that information, the current practice during take-off is to over compensate for the "total weight of passengers and their hand baggage" and thus use more thrust, and hence fuel, than is required. As will be appreciated by the skilled reader this over compensation is primarily for reasons of safety.

It is therefore an object of an embodiment of the present invention to obviate or at least mitigate the foregoing disadvantages of the methods of determining the weight of a body, and in particular an aircraft, as known in the art.

It is a further object of an embodiment of the present invention to provide a method and apparatus for accurately determining the weight of a body, and in particular a rolling body or vehicle e.g. an aircraft.

It is a further object of an embodiment of the present invention to provide a surface angle measuring device that may be employed within a method for accurately determining the weight of a body, and in particular a rolling body or vehicle e.g. an aircraft.

SUMMARY OF INVENTION

According to a first aspect of the present invention there is provided a method for determining the mass of a body, the method comprising:

applying and measuring a first motive force to the body to move the body in a first state of motion;

measuring a first acceleration of the body when in the first state of motion;

applying and measuring a second motive force to the body to move the body in a second state of motion;

measuring a second acceleration of the body when in the second state of motion; and calculating the mass of the body from the measured first and second motive forces and the measured first and second accelerations.

The above method provides a means for accurately determining the mass of the body while accounting for all the forces applied to the body e.g. friction, wind resistance and gravitational forces. It finds find particular application in the determination of the weight of a rolling body or vehicle and in particular a passenger aircraft.

Most preferably the first and or second motive forces move the body across an area of ground. The area of ground may be inclined at an angle $\theta$ relative to a true gravity horizontal.

Preferably the method further comprises measuring the angle of inclination $\theta$ between the area of ground and the true gravity horizontal. The measurement of the angle $\theta$ may employ a surface angle measuring device in accordance with any of the seventh to tenth aspects of the present invention.

The measurement of the first and or second motive forces are preferably corrected for the angle $\theta$ between the area of ground relative and the true gravity horizontal.

Preferably the first and or second accelerations are measured by an accelerometer mounted on the body.

The measurement of the first and or second accelerations are preferably corrected for the tilt angle $\alpha$ of the accelerometer relative to the ground.

The first state of motion may comprises a state of steady motion i.e. the first acceleration equals zero.

The first and or second states of motion may comprise states of acceleration i.e. the first and or second accelerations are not equal to zero.

The first or second motive forces may be applied by setting a thrust of an engine of the body.

Most preferably the body comprises an aircraft.

According to a second aspect of the present invention there is provided a method for determining the mass of a body, the method comprising:

applying and measuring a first motive force to the body to move the body in a first state of steady motion;

applying and measuring a second motive force to the body to move the body in a second state of steady motion wherein a direction of the second state of steady motion is at an to a direction of the first state of steady motion; and calculating the mass of the body from the measured first and second motive forces.

Embodiments of the second aspect of the invention may comprise features to implement the preferred or optional features of the first aspect of the invention or vice versa.

According to a third aspect of the present invention there is provided a method for determining the mass of a body, the method comprising:

applying and measuring a first motive force to the body to move the body in a first state of acceleration;

measuring a first acceleration of the body when in the first state of acceleration;

applying and measuring a second motive force to the body to move the body in a second state of acceleration;

measuring a second acceleration of the body when in the second state of acceleration; and calculating the mass of the body from the measured first and second motive forces and the measured first and second accelerations.

Embodiments of the third aspect of the invention may comprise features to implement the preferred or optional features of the first or second aspects of the invention or vice versa.

According to a fourth aspect of the present invention there is provided a method of calculating the thrust required for an aircraft take-off the method comprising the determination of the mass of the aircraft in accordance with any of the first to third aspects of the present invention.

Being able to more accurately determine the mass of the aircraft allows take-off to be achieved for lower values of engine thrust. This has obvious benefits it satisfying noise pollution level requirements for aircraft operators and for reducing ever increasing carbon taxes levied on aircraft operators as a result of the levels of carbon dioxide emission produced.

According to a fifth aspect of the present invention there is provided a method of calculating the fuel requirements for an aircraft journey the method comprising the determination of the mass of the aircraft in accordance with any of the first to third aspects of the present invention.

Being able to more accurately determine the mass of the aircraft allows for more accurate calculations of the fuel requirements for an aircraft journey to be made reducing the fuel loads required to be carried by the aircraft.

According to a sixth aspect of the present invention there is provided a method of calculating the flight path of an aircraft the method comprising the determination of the mass of the aircraft in accordance with any of the first to third aspects of the present invention.

Being able to more accurately determine the mass of the aircraft allows for the pilot of the aircraft to consider adopting flight paths at higher altitudes, for the same initial fuel load, without comprising the safety of the aircraft or the passengers on board. As is appreciated by those skilled in the art significant fuel savings, and thus reductions in carbon emissions, can be achieved, particularly on long haul flights, when a higher altitude flight path is employed.

According to a seventh aspect of the present invention there is provided a surface angle measuring device the surface angle measuring device comprising a chassis that defines a first and a second rangefinder measuring position, the first and second rangefinder measuring positions being rotationally separated by an angle $\varphi$; a first rangefinder and a first inclinometer.

The incorporation of the first inclinometer allows the surface angle measuring device to function irrespective of the angle between the chassis and true horizontal. This significantly simplifies the measurement process since there is no tolerance restriction relating to the angle at which the chassis may be deployed.

Most preferably the chassis provides a means for mounting the surface angle measuring device on a body.

Preferably the first rangefinder is located at the first rangefinder position. In this embodiment a second rangefinder is preferably located at the second rangefinder position. The inclinometer may be positioned having a horizontal axis perpendicular to a line bisecting the angle $\varphi$ between the first and second rangefinder positions.

Alternatively, the first inclinometer is fixed to the first rangefinder. In this embodiment the surface angle measuring device further comprises a second inclinometer fixed to the second rangefinder.

Optionally the first rangefinder is pivotally mounted to provide rotational movement between the first and second rangefinder measuring positions. In this embodiment the first inclinometer is fixed to the first laser rangefinder.

Most preferably the first and or second rangefinders comprise a laser rangefinder.

According to a eighth aspect of the present invention there is provided a surface angle measuring device the surface angle measuring device comprising first and second rangefinders mounted within first and second measuring positions, the first and second measuring positions being rotationally separated by an angle $\varphi$, and a first inclinometer having a horizontal axis perpendicular to a line bisecting the angle $\varphi$ between the first and second rangefinders.

Embodiments of the eighth aspect of the invention may comprise features to implement the preferred or optional features of the seventh aspect of the invention or vice versa.

According to a ninth aspect of the present invention there is provided a surface angle measuring device the surface angle measuring device comprising first and second rangefinders mounted within first and second measuring positions, the first and second measuring positions being rotationally separated by an angle $\varphi$, a first inclinometer fixed to the first rangefinder and a second inclinometer fixed to the second rangefinder.

Embodiments of the ninth aspect of the invention may comprise features to implement the preferred or optional features of the seventh or eighth aspects of the invention or vice versa.

According to a tenth aspect of the present invention there is provided a surface angle measuring device the surface angle measuring device comprising a rangefinder pivotally mounted between a first and a second measuring position, the first and second measuring positions being rotationally separated by an angle $\varphi$, and an inclinometer fixed to the first rangefinder.

Embodiments of the tenth aspect of the invention may comprise features to implement the preferred or optional features of the seventh to ninth aspects of the invention or vice versa.

According to an eleventh aspect of the present invention there is provided an inertial mass system for determining the mass of a body, the inertial mass system comprising an accelerometer for measuring the acceleration of the body and a processor configured to calculate the mass of the body based on:

a measured value of a first motive force applied to the body to move the body in a first state of motion;

a measured value of a first acceleration of the body when in the first state of motion;

a measured value of a second motive force applied to the body to move the body in a second state of motion; and a measured value of a second acceleration of the body when in the second state of motion.

Preferably the inertial mass system further comprises an interface that provides a means of communication between the inertial mass system and an aircraft flight management system.

The first and second motive forces applied to the body may therefore be measured by an engine management system of the flight management system.

Most preferably the accelerometer comprises a tilt sensor. Incorporating a tilt sensor allows the measured first and second accelerations to be corrected for the tilt angle α of the accelerometer relative to the ground.

Most preferably the inertial mass system further comprises a surface angle measuring device in accordance with any of the seventh to tenth aspects of the present invention.

According to a twelfth aspect of the present invention there is provided a flight management system for an aircraft comprising an inertial mass system in accordance with the eleventh aspect of the present invention.

According to a thirteenth aspect of the present invention there is provided an aircraft comprises a flight management system in accordance with the twelfth aspect of the present invention.

BRIEF DESCRIPTION OF THE DRAWINGS

There will now be described, by way of example only, various embodiments of the invention with reference to the drawings, of which.

In the description which follows, like parts are marked throughout the specification and drawings with the same reference numerals. The drawings are not necessarily to scale and the proportions of certain parts have been exaggerated to better illustrate details and features of embodiments of the invention.

DETAILED DESCRIPTION OF PREFERRED EMBODIMENTS

Figure 1:
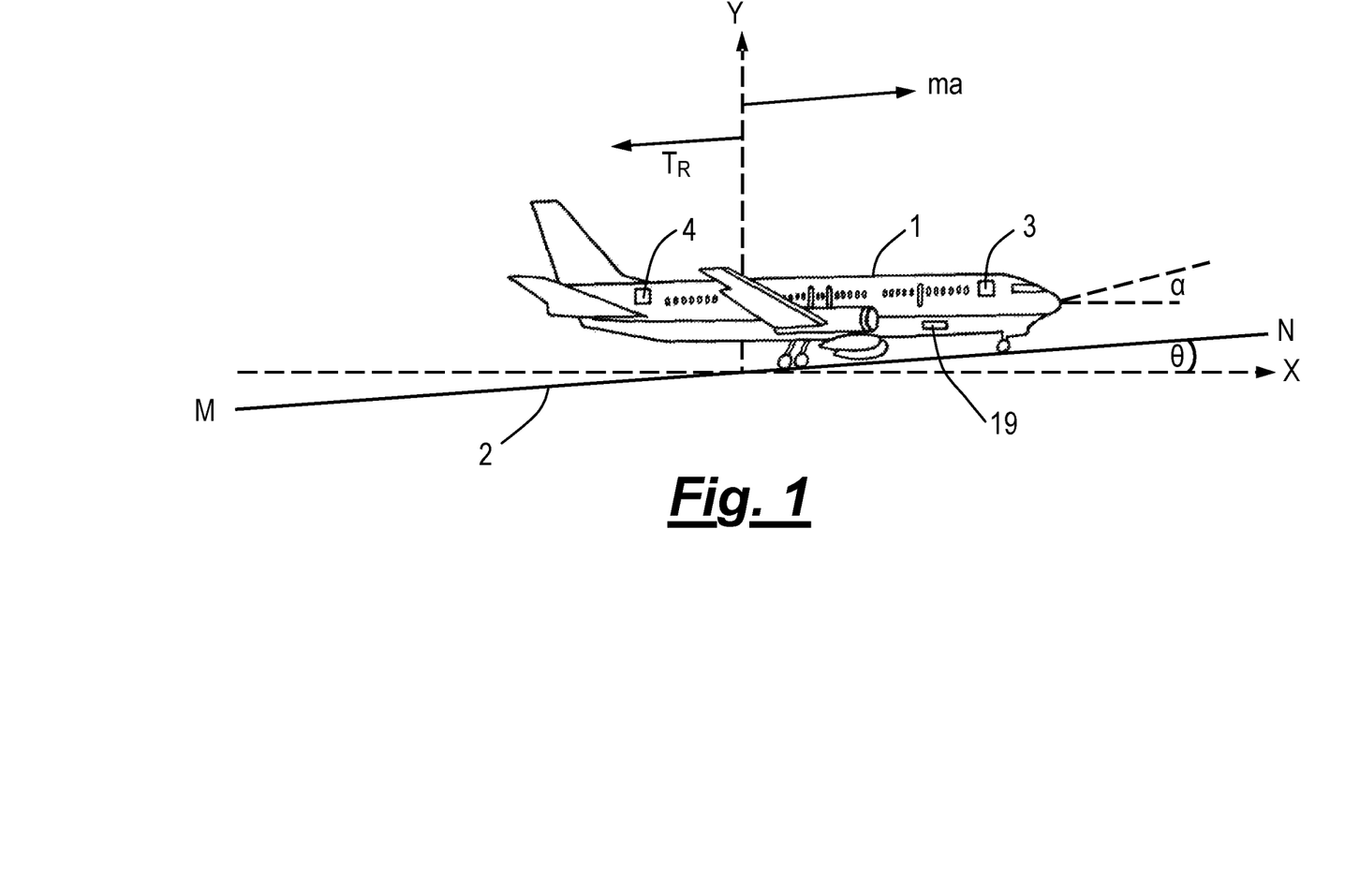
FIG. 1 presents a schematic representation of a passenger aircraft travelling along the ground.

Details of the present invention will now be described with reference to FIG. 1. In particular, FIG. 1 presents a schematic representation of a passenger aircraft 1 travelling along the ground 2. X and Y axes are included in FIG. 1 to represent true horizontal and true vertical, respectively. The ground 2 can be seen to be at an angle α relative to the horizontal axis X.

The motive force F acting on the aircraft 1 can be determined in accordance with the principles of Newton's Second Law of Motion, as detailed in equation 1 below:

$$F = ma + T_R \quad (1)$$

where a=acceleration of the aircraft along the ground;

m=mass of the aircraft; and $T_R$=the total rolling resistance of the aircraft.

When the aircraft 1 moves along the ground 2 it will be in one of two states, either a state of steady motion (a=0) or a state of acceleration (a≠0). This fact can be exploited in order to provide means for calculating the mass, and hence the weight, of the aircraft 1.

The principle behind the present invention is to employ an accelerometer 3 to measure the acceleration of the aircraft 1 across the ground 2 and hence determine whether the aircraft is in a state of steady motion or a state of acceleration. The accelerometer 3 may be mounted on the aircraft 1, as shown in the embodiment of FIG. 1

In a preferred embodiment the motive force F of the aircraft 1 is measured initially when the aircraft 1 is in a state of steady motion (a=0) e.g. when the aircraft 1 is taxiing across the ground 2 at a constant velocity. In this state the measured motive force F applied by the thrust of the engines to the aircraft 1 equals the total rolling resistance $T_R$ of the aircraft 1.

The motive force F is then measured when the aircraft 1 is in a state of acceleration (a≠0). Equation (1) can then be solved so as to give an accurate value for the mass of the aircraft 1.

The weight W of the aircraft 1 is then given be the following known equation:

$$W = mg \quad (2)$$

where g=gravitational acceleration.

The above methodology can be adapted so as to take account of the fact that the ground 2 may not be parallel to the true horizontal (axis X) i.e. the angle θ≠0. It will be appreciated that several factors will contribute to the total rolling resistance $T_R$ of the aircraft 1. These factors include the friction forces acting on the aircraft $t_f$, wind resistance acting on the aircraft $t_w$, and the gravitational force acting on the aircraft in the direction parallel the ground 2. For the aircraft 1 of FIG. 1, $T_R$ can be expressed as follows:

$$T_R = t_f + t_w + t_g \quad (3)$$

where $$t_g = mg \sin \theta \quad (4)$$

It will be appreciated by the skilled reader that the inclination of the ground 2 can therefore cause a positive resistance if the angle θ>0, a negative resistance if the angle θ<0 and that if the aircraft 1 travels in a state of steady motion (a=0) along a level section of ground 2 then $t_g$ equals zero and so does not contribute to the forces resisting the motion $T_R$ i.e. the measured motive force F provided by the thrust of the engines thus gives the combined value of $t_f + t_w$.

The angle θ may be a known value for a particular section of ground. Alternatively, the angle a may be measured as the aircraft 1 travels over the ground 2. A surface angle measuring device 19 suitable for this purpose is described in further detail below. The motive force F is then measured when the thrust of the engines move the aircraft 1 to be in a state of acceleration (a≠0) and equations (1), (3) and (4) are again employed to calculate the mass of the aircraft 1.

A pilot tube 4 may be employed to measure wind speed and so as to provide a direct means for calculating the wind resistance acting on the aircraft $t_w$. The pilot tube 4 may be mounted on the aircraft 1, as shown in the embodiment of FIG. 1. When combined with the above described measurement of $T_R$ on a level section of ground 2 a value for the friction forces acting on the aircraft $t_f$ can also be individually determined.

The above methodology can be further adapted so as to take account of the fact that the accelerometer 3 is likely to be mounted on the aircraft 1 so as to be tilted relative to the ground 2. The accelerometer 3 therefore preferably comprises a tilt sensor 5 in order to measure the tilt angle a between the accelerometer 3 and true horizontal. In this embodiment equation (1) is adapted so as to be:

$$F = ma \cos(\alpha - \theta) + T_R \quad (5)$$

where $$T_R = (t_f + t_w) + mg \sin\theta \quad (6)$$

Employing the above methodology with equations (5) and (6) therefore provides a means for determining the mass of the aircraft 1 as it moves along the ground 2 while correcting for the angle θ of the ground 2 and the tilt angle a of the accelerometer 3 relative to the ground 2.

Figure 2:
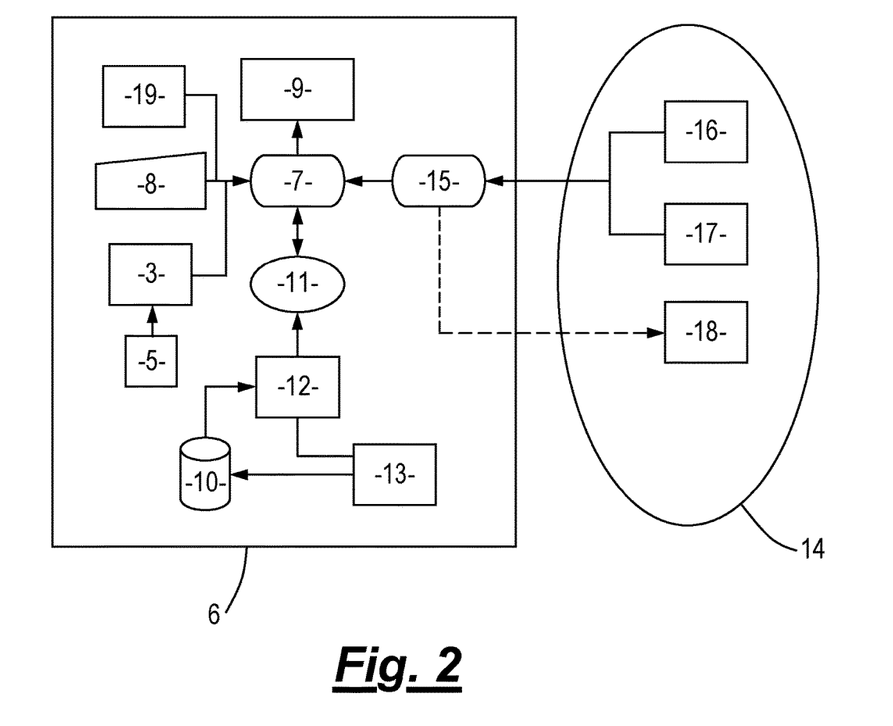
FIG. 2 presents a schematic diagram of an Aircraft Inertial Mass System employed by the passenger aircraft of FIG. 1.

FIG. 2 presents a schematic diagram of an Aircraft Inertial Mass System (AIMS) 6 employed by the aircraft 1 in order to implement the above methodology. The AIMS 6 can be seen to comprise the accelerometer 3 and the tilt sensor 5 which are connected to a processor 7 e.g. a computational processor unit (CPU). A surface angle measurement device 19, as described in further detail below may also be connected to the CPU 7. The CPU 7 may further comprise a function selection keyboard 8; a display 9 and a memory component 10 that stores various algorithms e.g. general data processing routines 11, real-time and historical data comparison and verification routines 12 and real-time data measurement and processing routines 13.

The CPU 7 is connected to the normal aircraft flight management system (FMS) 14 via an aircraft data bus interface 15. As can be seen from FIG. 2 the FMS 14 may comprise an engine management system 16 to provide data on the thrust of the aircraft engines; a GPS sensor 17 to assist with navigation and real time data verification; and an auto-pilot system 18.

It will be appreciated that the CPU 7 may provide a means for measuring time. This time data may therefore be combined with the data obtained by the accelerometer 3 such that the velocity and distance travelled by the aircraft 1 can be determined. By reading data from the aircraft's GPS sensor 17, the aircraft's location at different times can also be determined. Using this data, the acceleration, velocity and distance travelled can be determined independently of the accelerometer 3. This data can therefore be used to verify the data produced by the accelerometer 3. This feature provides a level of assurance as to the validity of the data produced by the AIMS 6.

An alternative embodiment for calculating the mass, and hence the weight off the aircraft 1 will now be described. In the first instance, a first motive force $F_1$ of the aircraft 1 is measured when the aircraft 1 is travelling in a first state of acceleration ($a_1 \neq 0$). A second motive force $F_2$ of the aircraft 1 is then measured when the aircraft 1 is travelling in a second state of acceleration ($a_2 \neq 0$). It will be appreciated that the angle θ for this area of ground is either required to be known or measured, preferably at the time the aircraft is travelling over the ground 2. In a similar fashion the tilt angle a between the accelerometer 3 and true horizontal is also required. Simultaneous equations based on equation (5) can then be solved so as to determine a value for the mass of the aircraft 1.

A further alternative embodiment for calculating the mass, and hence the weight off the aircraft 1 will now be described. In this embodiment the motive force F of the aircraft 1 is initially measured when the aircraft 1 is travelling across a level area of ground 2 (i.e. angle θ=0) in a state of steady motion (a=0). From equation (6) it can be seen than in this state the thrust provided by engines of the aircraft 1 gives the combined value of ($t_f + t_w$).

The motive force F of the aircraft 1 is then measured when the aircraft 1 is travelling across a sloping area of ground 2 (i.e. angle θ≠0) while again in a state of steady motion (a=0). It will be appreciated that the angle θ for this area of ground is either required to be known or measured, preferably at the time the aircraft is travelling over the ground 2. Since the combined value of ($t_f + t_w$) has previously been determined, equation (6) can then be employed to calculate a value for the mass of the aircraft 1 and thus the weight of the aircraft 1 can similarly be determined from equation (2).

In the above method the accelerometer 3 is again employed to determine when the aircraft 1 is in a state of steady motion (a=0) on both a level area of ground 2 (angle θ=0) and on a sloping area of ground 2 (angle θ≠0). However, since method does not require any compensation for the tilt of the accelerometer 3 relative with the ground 2 there is no need for the tilt sensor 5 to be incorporated therein.

Surface Angle Measuring Device

In practice, surfaces are rarely found to be truly horizontal or vertical relative to the direction of gravity. Measurement of the angle of a surface relative to the direction of a true gravity horizontal or vertical can be made using spirit levels or electronic inclinometers. The difficulty with employing such apparatus is that they require the instrument to be in direct or indirect contact with the surface. Furthermore, such apparatus requires to be stationary deployed and so cannot be used to measure the inclination of a surface from a moving body.

Figure 3:
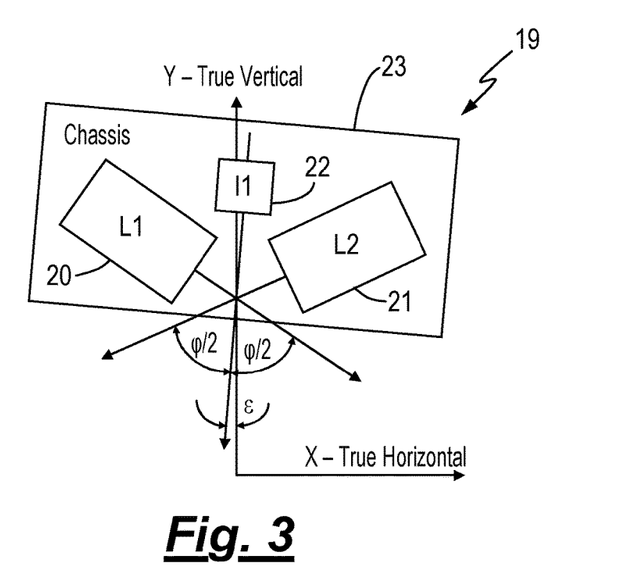
FIG. 3 presents a schematic representation of a surface angle measuring device in accordance with an embodiment of the present invention.

A surface angle measuring device 19, as shown in FIG. 3, suitable for use on the aircraft 1 of FIG. 1 will now be described that allows for the accurate measurement of the inclination of the ground 2 relative to a true horizontal plane (as represented by axis X). The surface angle measuring device 19 can be seen to comprise a first rangefinder 20, a second rangefinder 21 and an inclinometer 22 all of which are mounted on a chassis 23. Preferably the first 20 and or second 21 rangefinders comprise laser rangefinders. The first 20 and second 21 rangefinders and the inclinometer 22 are mounted on the chassis 23 in such a way that an angle φ between the line of measurement of the first 20 and second 21 rangefinders is known (e.g. the angle between the laser output of the first 20 and or second 21 rangefinders) and the inclinometer 22 is positioned such that its horizontal axis is perpendicular to the line bisecting the angle φ between the first 20 and second 21 laser rangefinders. It will be appreciated that the body on to which the chassis 23 is mounted (e.g. the aircraft 1) may not allow the chassis 23 to be orientated parallel to the true horizontal. However the inclinometer 22 provides a means for measuring the inclination ε of the chassis 23 and hence the first 20 and second 21 laser rangefinders relative to the true horizontal.

Figure 4:
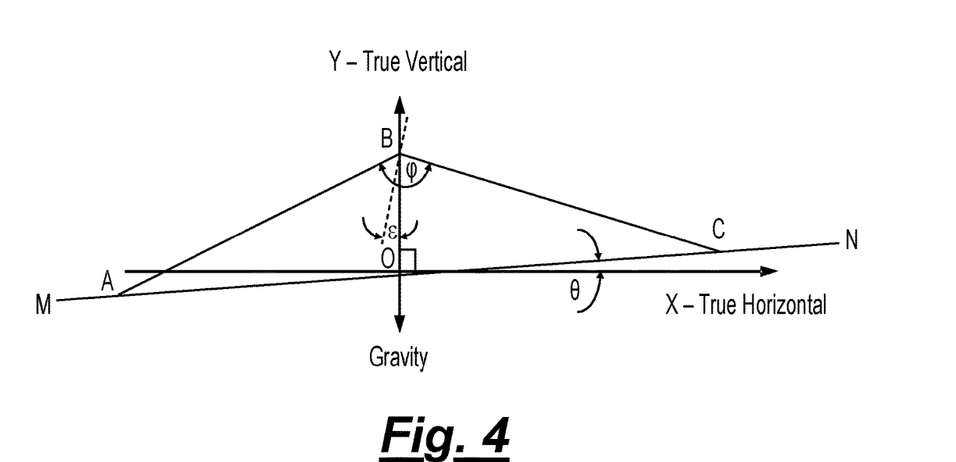
FIG. 4 presents a schematic representation of the surface angle measuring device when deployed with the aircraft of FIG. 1.

To illustrate the operation of the surface angle measuring device 19 FIG. 4 presents a schematic representation of the device 19 when deployed with the aircraft 1 of FIG. 1. Here AB represents the light beam from the second laser rangefinder 21 having a length $L_2$ and BC the light beam from the first laser rangefinder 20 having a length $L_1$. The laser rangefinders 21 and 20 thus determine the distances AB and BC respectively while the inclinometer 22 measures the angle ε. When the angle φ between the first 20 and second 21 laser rangefinders is known the angle θ can be determined from the following equation:

$$\theta = \sin^{-1}\left[\frac{L_2 \sin\psi_1 - L_1 \sin\psi_2}{\sqrt{L_2^2 + L_1^2 - 2L_2 L_1 \cos\varphi}}\right] \quad (7)$$

where $$\psi_1 = \frac{\pi - \varphi}{2} - \epsilon \quad (8)$$

$$\psi_2 = \frac{\pi - \varphi}{2} + \epsilon \quad (9)$$

To calculate the angle θ the data signals from the first 20 and second 21 laser rangefinders and the inclinometer 22 can simply be input to a CPU (e.g. CPU 7) to carry out the calculations and either display the result directly or pass the information on to other equipment e.g. the AIMS 6 or the FMS 14.

While the measurements described above are used to calculate the angle θ, this is in effect the slope between two discrete points on the surface represented by MN. By moving the chassis 23 along the slope a number of data points can be determined and thus a mean value of the angle θ of the slope of the surface can be calculated.

The above described surface angle measuring device 19 employs two rangefinders 20 and 21 and an inclinometer 22 and is in effect a slope measuring system that requires no manual intervention once the chassis 3 on which the device 19 is mounted is placed in position. It will be appreciated that in an alternative embodiment, as represented schematically in FIG. 5, the surface angle measuring device 24 may comprise a single rangefinder (preferably a laser rangefinder) mounted on a pivot, point B. In this embodiment the inclinometer 22 is fixed to the rangefinder in such a way that the angle of the line of measurement (e.g. the laser beam) is measured relative to the true horizontal or vertical. The laser rangefinder is thus set to an angle on the pivot and the distance $L_2$ (AB) is measured along with the angle $\Psi_1$. The laser rangefinder is then pivoted and set to another angle and the distance $L_1$ is measured along with the angle $\Psi_2$.

Figure 5:
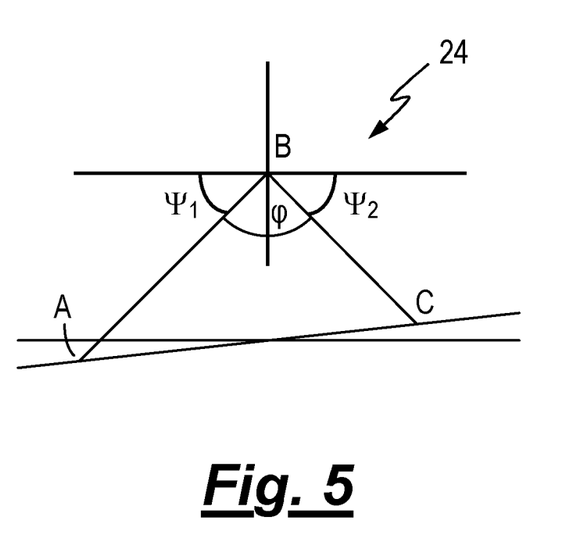
FIG. 5 presents a schematic representation of an alternative embodiment of the surface angle measuring device when deployed with the aircraft of FIG. 1.

The angle φ is then found from the relationship $\varphi = \pi - \Psi_1 - \Psi_2$ and the slope of the line AC, the angle θ, is again found by employing equation (7). The laser rangefinder and the inclinometer can both have electronic interfaces that allow the measurements to again be passed to a CPU to carry out the calculations and display the result.

In a yet further alternative embodiment it will be appreciated that two inclinometers 22 may be employed within the surface angle measuring device 19, one mounted on the first laser rangefinder 20 and one mounted on the second laser rangefinder 21. This arrangement allows the angles $\Psi_1$ and $\Psi_2$ to be measured directly as described above and the angle θ of the surface MN to be determined as described previously. Although involving additional equipment, this arrangement has the advantage that the two laser rangefinders 20 and 21 do not need to be mounted on the chassis 23 relative to each other with a high degree of precision.

The above described methods and apparatus incorporate a number of features that allow the external factors that influence the force required to produce a given acceleration on a body to be determined e.g. the total rolling resistance $T_R$ of a rolling body such as an aircraft and thereby allows the mass of the body to be accurately determined.

Being able to accurately determine the mass, and hence the weight of an aircraft offers a number of significant advantages. In the first instance the engine thrust required for take-off can be more accurately determined thus reducing the requirement to overcompensate for passenger and hand luggage weight as is presently case in the systems of the prior art without there being any compromise to the safety of the aircraft or the passengers on board.

Employing less engine thrust for take-off also results in lower aircraft noise and less fuel being employed. This has obvious benefits it satisfying noise pollution level requirements for aircraft operators and for reducing ever increasing carbon taxes levied on aircraft operators as a result of the levels of carbon dioxide emission produced.

More accurate knowledge of the levels of use the fuel during take-off also has the added benefit that a pilot can now consider flight paths at higher altitudes without comprising the safety of the aircraft or the passengers on board. As is appreciated by those skilled in the art significant fuel savings can be achieved, particularly on long haul flights, when a higher altitude flight path is employed.

In determining the mass of a body (e.g. an aircraft) an important factor to know is the topography of the ground over which it is travelling. The described surface angle measuring device provides a means for accurately determining factor that does not require direct or indirect contact with the surface and which does not require the body to be stationary.

A method for determining the mass of a body is described. The method comprises the application and measurement of a first motive force to the body to move the body in a first state of motion. The acceleration of the body is also measured at this time. This methodology is repeated for a second state of motion. The measured motive forces and accelerations are then used to calculate the mass, and hence the weight of the body. An accelerometer may be employed to measure the accelerations. The methods may be adapted so as to correct for the angle θ of the ground across which the body is moved and or the tilt angle α of the accelerometer relative to the ground. The methods may employ a novel surface angle measuring device that does not require contact with the ground and which does not require the body to be stationary.

Throughout the specification, unless the context demands otherwise, the terms "comprise" or "include", or variations such as "comprises" or "comprising", "includes" or "including" will be understood to imply the inclusion of a stated integer or group of integers, but not the exclusion of any other integer or group of integers.

Furthermore, reference to any prior art in the description should not be taken as an indication that the prior art forms part of the common general knowledge.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. A method for determining the mass of an aircraft, the method comprising:
applying and measuring a first motive force to the aircraft to move the aircraft in a first state of motion across an area of ground;
employing an accelerometer mounted on the aircraft to measure a first acceleration of the aircraft when in the first state of motion;
correcting the measurement of the first acceleration for a tilt angle $\alpha$ of the accelerometer relative to the ground;
applying and measuring a second motive force to the aircraft to move the aircraft in a second state of motion;
measuring a second acceleration of the aircraft when in the second state of motion;
measuring the angle of inclination $\theta$ between the area of ground and a true gravity horizontal; and
calculating the mass of the aircraft from the measured first and second motive forces, the measured first and second accelerations, and the measured angle of inclination $\theta$.

2. A method for determining the mass of an aircraft as claimed in claim 1 wherein the second motive force moves the body across an area of ground.

3. A method for determining the mass of an aircraft as claimed in claim 1 wherein the measurement of the first motive force is corrected for the angle $\theta$ between the area of ground and the true gravity horizontal.

4. A method for determining the mass of an aircraft as claimed in claim 1 wherein the measurement of the second motive force is corrected for the angle $\theta$ between the area of ground and the true gravity horizontal.

5. A method for determining the mass of an aircraft as claimed in claim 1 wherein the second acceleration is measured by an accelerometer mounted on the aircraft.

6. A method for determining the mass of an aircraft as claimed in claim 5 wherein the measurement of the second acceleration is corrected for the tilt angle $\alpha$ of the accelerometer relative to the ground.

7. A method for determining the mass of an aircraft as claimed in claim 1 wherein the first state of motion comprises a state of steady motion.

8. A method for determining the mass of an aircraft as claimed in claim 1 wherein the first state of motion comprises a state of acceleration.

9. A method for determining the mass of an aircraft as claimed in claim 1 wherein the second state of motion comprises a state of steady motion.

10. A method for determining the mass of an aircraft as claimed in claim 1 wherein the second state of motion comprises a state of acceleration.

11. A method for determining the mass of an aircraft as claimed in claim 1 wherein the first motive force is applied by setting a thrust of an engine of the aircraft.

12. A method for determining the mass of an aircraft as claimed in claim 1 wherein the second motive force is applied by setting a thrust of an engine of the aircraft.

13. A method of calculating the thrust required for an aircraft take-off, the method comprising the determination of the mass of the aircraft in accordance with the method as defined by claim 1.

14. A method of calculating the fuel requirements for an aircraft journey, the method comprising the determination of the mass of the aircraft in accordance with the method as defined by 1.

15. A method of calculating the flight path of an aircraft, the method comprising the determination of the mass of the aircraft in accordance with the method as defined claim 1.

16. An inertial mass system for determining the mass of an aircraft, the inertial mass system comprising an accelerometer for measuring the acceleration of the aircraft over an area of ground, a surface angle measuring device for measuring the angle of inclination $\theta$ between the area of ground and a true gravity horizontal, and a processor configured to calculate the mass of the aircraft based on:
a measured value of a first motive force applied to the aircraft to move the aircraft in a first state of motion;
a measured value of a first acceleration of the aircraft when in the first state of motion, wherein the measured value of the first acceleration is corrected for a tilt angle $\alpha$ of the accelerometer relative to the ground;
a measured value of a second motive force applied to the aircraft to move the aircraft in a second state of motion;
a measured value of a second acceleration of the aircraft when in the second state of motion; and
the angle of inclination $\theta$ between the area of ground and the true gravity horizontal.

17. An inertial mass system as claimed in claim 16 wherein the inertial mass system further comprises an interface that provides a means of communication between the inertial mass system and an aircraft flight management system.

18. An inertial mass system as claimed in claim 17 wherein the first and second motive forces applied to the body are measured by an engine management system of the flight management system.

19. An inertial mass system as claimed in claim 16 wherein the accelerometer comprises a tilt sensor.

20. An inertial mass system as claimed in claim 16 wherein the inertial mass system further comprises a surface angle measuring device.

21. An inertial mass system as claimed in claim 20 wherein the surface angle measuring device comprising a chassis that defines first and second rangefinder measuring positions, the first and second rangefinder measuring positions being rotationally separated by an angle $\varphi$; a first rangefinder and a first inclinometer.

22. An inertial mass system as claimed in claim 21 wherein the chassis provides a means for mounting the surface angle measuring device on the aircraft.

23. An inertial mass system as claimed in claim 21 wherein the first rangefinder is located at the first rangefinder position.

24. An inertial mass system as claimed in claim 21 wherein a second rangefinder is located at the second rangefinder position.

25. An inertial mass system as claimed in claim 21 wherein the inclinometer is positioned having a horizontal axis perpendicular to a line bisecting the angle $\varphi$ between the first and second rangefinders.

26. An inertial mass system as claimed in claim 21 wherein the first inclinometer is fixed to the first rangefinder.

27. An inertial mass system as claimed in claim 26 wherein the surface angle measuring device further comprises a second inclinometer fixed to the second rangefinder.

28. An inertial mass system as claimed in claim 21 wherein the first rangefinder is pivotally mounted to provide rotational movement between the first and second rangefinder measuring positions.

29. An inertial mass system as claimed in claim 28 wherein the first inclinometer is fixed to the first rangefinder.

30. An inertial mass system as claimed in claim 21 wherein the first rangefinder comprises a laser rangefinder.

31. An inertial mass system as claimed in claim 24 wherein the first rangefinder comprises a laser rangefinder.

32. A flight management system for an aircraft comprising an inertial mass system as claimed in claim 16.

33. An aircraft comprising a flight management system as claimed in claim 32.

* * * * *